United States Patent [19]

Bognaes et al.

[11] 3,828,709

[45]*Aug. 13, 1974

[54] LNG CARGO TANK INSULATION SYSTEM

[75] Inventors: Ragnar Bognaes, Jeloy; Olav Solberg, Oslo, both of Norway

[73] Assignee: Kvaenner Brug AS, Oslo, Norway

[*] Notice: The portion of the term of this patent subsequent to Aug. 1, 1989, has been disclaimed.

[22] Filed: July 28, 1972

[21] Appl. No.: 275,893

Related U.S. Application Data

[63] Continuation-in-part of Ser. No. 81,101, Oct. 15, 1970, Pat. No. 3,680,323.

[52] U.S. Cl. ............... 114/74 A, 62/55, 220/9 LG, 220/15
[51] Int. Cl. .......................................... B63b 25/08
[58] Field of Search .......... 114/74 A; 220/15, 9 LG; 62/45, 55

[56] References Cited
UNITED STATES PATENTS

| | | | |
|---|---|---|---|
| 2,993,460 | 7/1961 | Dreyer | 114/74 A |
| 3,224,623 | 12/1965 | Knox, Jr. et al. | 220/9 LG |
| 3,380,611 | 4/1968 | Brougham et al. | 220/1 |
| 3,671,315 | 6/1972 | Iarossi | 114/74 A |

*Primary Examiner*—Meyer Perlin
*Assistant Examiner*—Ronald C. Capossela
*Attorney, Agent, or Firm*—Curtis, Morris & Safford

[57] ABSTRACT

In a marine vessel having a hull structure for transporting or storing a cargo tank adapted to contain liquified and/or compressed gas, the tank is supported within the hull in any convenient manner by a support structure, with the exterior surface of the tank substantially entirely covered by a thermal insulation material. The insulation material also covers a portion of the support structure and extends from the point of juncture of the support structure with the tank towards a termination point spaced from the hull. The insulation material covering the support structure is tapered from a maximum thickness adjacent the point of juncture of the support means with the tank to a minimum thickness at the termination point so as to create a controlled temperature gradient in the support structure thereby to minimize the thermal stresses in the tank at the point of juncture thereof with the support structure.

9 Claims, 5 Drawing Figures

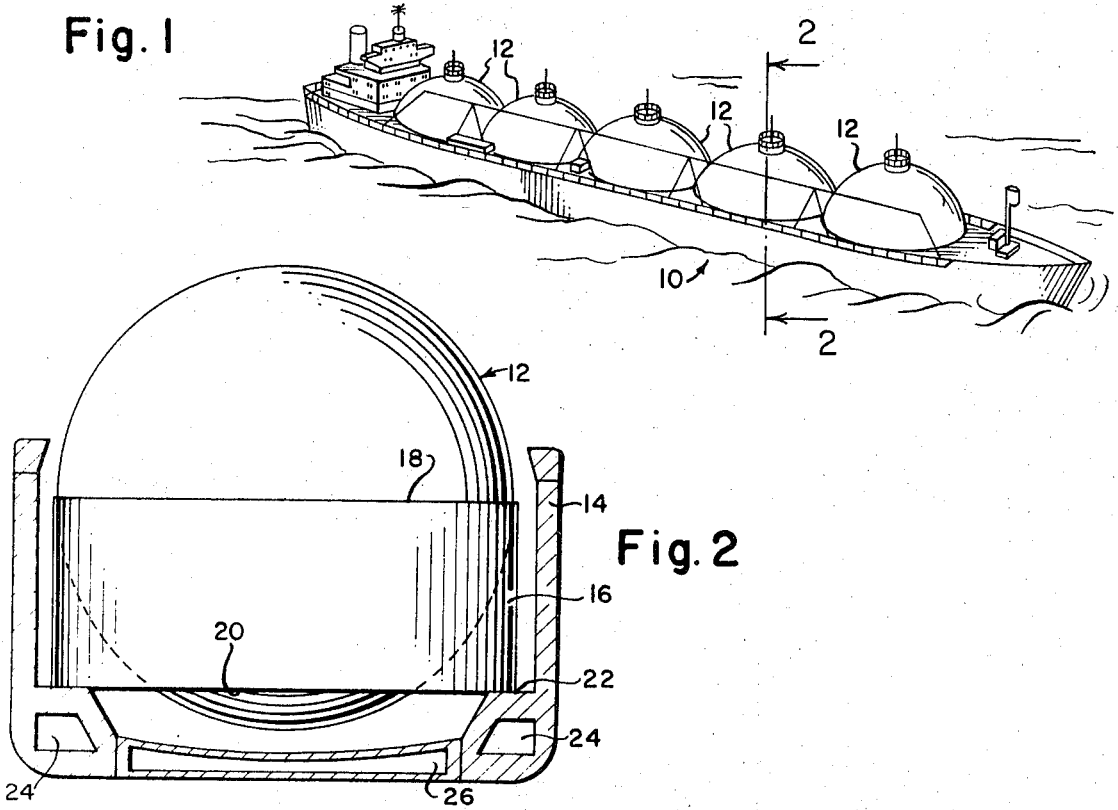
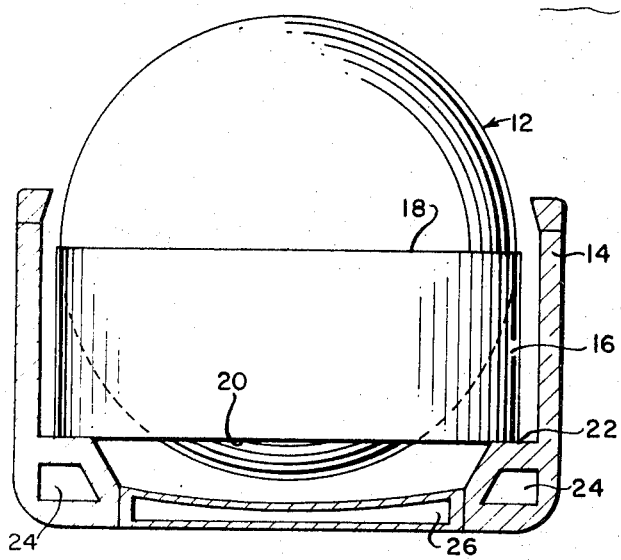
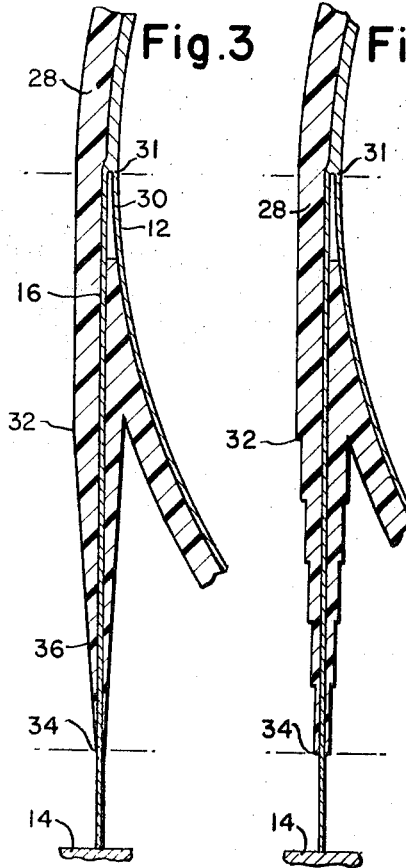
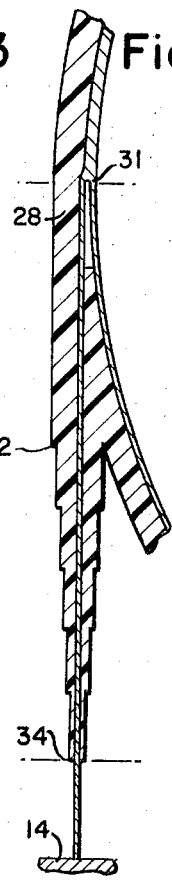
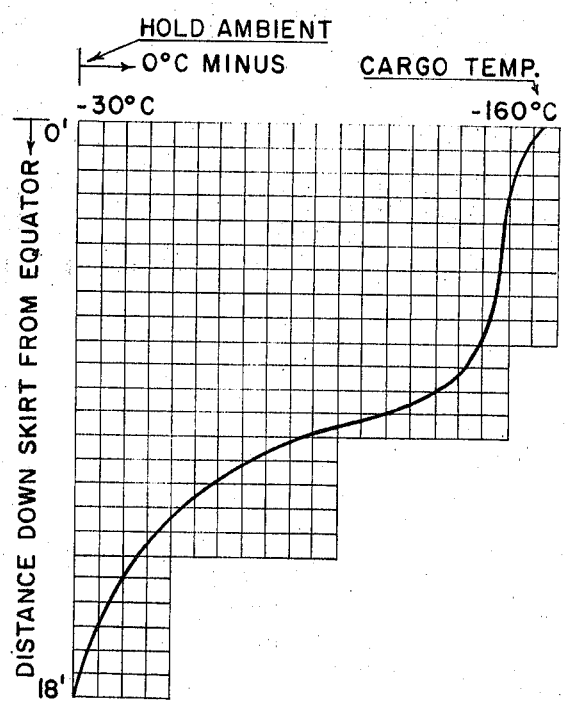

LNG CARGO TANK INSULATION SYSTEM

This application is a continuation-in-part of application Ser. No. 81,101, filed Oct. 15, 1970 now U.S. Pat. No. 3,680,323, the disclosure of which is incorporated herein by reference.

The present invention relates to the storage and transportation of liquified and/or compressed gas (hereinafter referred to as "liquified gas") in a cargo tank on board a marine vessel and more particularly to an insulation system for the cargo tank and support structure which minimizes the thermal stresses in the tank at the juncture of the tank and the support structure.

The safe and efficient storage and transportation of liquified natural gas, as for example, liquified methane at −260°F, has presented numerous problems to the shipbuilding industry. These problems arise from various sources, and in particular from the static and dynamic moments, deflections, or deformation of the vessel structure in response to cargo loading and wind and wave forces, as well as from the stresses produced by the extreme temperature variations in the tank when loaded and unloaded, which extremes cause severe thermal expansions and contractions of the tank structure.

When gas tanks for liquified gas are mounted on the shore, strong and rigid supporting structures are used to great advantage. However, such structures are too large and cumbersome for use in shipboard applications. Moreover, such conventional shore based tank support systems would have to be substantially altered in order to withstand the various forces that are imposed on a vessel during an ocean voyage.

Because of the complex loads applied to liquid gas cargo tanks as a result of the dynamic movements and thermal stresses applied to the tank, it is desirable to simplify the tank and support structure as much as possible in order to reduce the stresses in the tank and to make those stresses determinant so as to produce a "fail safe" containment system, i.e., one which will merely "gas leak" and then "liquid spray leak" if a tank wall is cracked, while avoiding the possibility of catastrophic failure. Such a system is disclosed in our above-identified patent application in which apparatus is provided for storing liquified gas on board a transport marine vessel in which an independently constructed cargo tank, adapted to contain liquified gas under several atmospheres of pressure, is supported by a supporting structure integrally secured to the tank and the hull structure of the vessel. One supporting structure disclosed in that application includes an annular skirt welded at one edge to a peripheral portion of the cargo tank and welded at its opposite edge to the hull structure, thereby to provide additional rigidity to the hull structure and minimize the transference of stresses from the hull structure to the tank. In addition, the supporting skirt is adapted to accommodate changes in the dimensional characteristics of the cargo tank due to temperature changes in the tank during loading and unloading of the liquified gas and to isolate these dimensional changes from the hull structure and the tank. By the accurate and generally tangential securement of the supporting skirt to the pressure vessel cargo tank and to the hull structure, the stresses within the skirt and the tank may be accurately predetermined so that the tank may be designed to provide a fail safe containment system in that the stress levels and materials in the tank and supporting structure can be selected so that the tank will merely "gas leak" and then "liquid spray leak" if the tank wall is cracked, while, due to the stress determinancy of the tank system, the possibility of a catastrophic failure is eliminated.

Utilization of a supporting skirt as described in our prior application also provides a favorable transference of forces between the hull structure and the tank since the skirt is connected immediately adjacent and substantially tangentially to the tank and thus avoids the large eccentricities provided by the previously proposed cargo tank supporting structures. Further, since a single walled vessel is utilized as a cargo tank, and since the support skirt structure is relatively simple and facilitates non-destructive testing of the tank, skirt and connections therebetween, the stresses to which the tank and support structure will be subjected can be readily determined and documented. As a result, the safety requirements of the various shipping regulating bodies are met and no outer gross liquid containing or secondary barrier type safety tank is required.

The various stresses applied to a cargo tank in a marine vessel which must be considered in determining the dimensional characteristics of the tank and the support structure in order to provide a fail safe containment system include the static, dynamic and thermal stresses applied by the weight of the tank and liquid therein, the dynamic loads of the ship in movement through the seas, and the thermal stresses produced by the changes in temperature in the tank during loading and unloading. In order to simplify the determination of the tank structure, it is desirable and extremely beneficial to minimize and control thermal effects on the cargo tank and on the hull structure in order to make optimum use of the available material forming the tank structure in order to accommodate only, or mainly, the static and dynamic load components. Thus, by eliminating thermal stresses in the tank, only the static and dynamic loads applied thereto must be considered in the design of the tank, thus greatly simplifying the design and construction of a fail safe containment system.

Accordingly, it is an object of the present invention to produce a controlled thermal gradient in the support structure of a liquid gas cargo tank so as to isolate thermal stresses from the tank itself.

Another object of the present invention is to minimize thermal stresses in a cargo tank for liquid gas.

Yet another object of the present invention is to transport liquified gas in a marine vessel which is relatively simple and inexpensive in construction.

Yet another object of the invention is to transport liquified gas in a single walled pressure vessel type tank, without the need for a liquid containing secondary barrier.

Yet another object of the present invention is to provide an integrated transportation system, of ship, hull and cargo tank, for liquified gas in which the stresses to which the system is subjected are accurately predetermined in those areas which influence cargo containment.

In accordance with an aspect of the present invention a storage system is provided for storing and transporting liquified gas on board a marine vessel. The system includes a cargo tank formed as a pressure vessel which is adapted to contain liquified gas under at least atmospheric pressure and which is supported on the marine vessel in any convenient manner in spaced relation to the hull. In the preferred embodiment of the invention, the cargo tank itself is a pressure vessel having no reinforcement structures inside so that the tank forms a clean membrane with no secondary interior structures limiting its thermal contraction or expansion. As a result, no thermal stresses are set up in the tank itself upon expansion and contraction. Thus, by eliminating thermal stresses imposed on the tank by the supporting structure, in accordance with the present invention, virtually the entire thickness of the tank shell is then available to carry static and dynamic loads only. Moreover, because of the provision of thermal insulation material on the support means, as described hereinafter, thermal stresses applied to the tank by the support structure are minimized and approach zero away from the junction of the support structure with the tank.

One preferred supporting system used with the present invention is integrally connected at one end to the hull structure and at its opposite end to the tank, to thermally isolate the tank from the hull structure. The tank is substantially entirely covered by thermal insulating material which is secured thereto in any convenient manner, with a portion of the tank supporting system being similarly covered by the insulation material. This material extends along the supporting system or means from the point of juncture of the support means with the tank towards a termination point spaced from the hull structure. The insulation material is tapered from a position adjacent the point of juncture to the termination point in a predetermined pattern so as to produce a controlled thermal gradient in the support means thereby to minimize thermal stresses in the tank at the point of juncture thereof with the supporting means. In this manner the thermal stresses are produced in the support means itself and not distributed to the tank. As a result, the design of the tank is substantially simplified, thereby facilitating the design of a stress determinant structure such as that described and claimed in our above-identified application.

The above, and other objects, features and advantages of this invention, will be apparent in the following detailed description of an illustrative embodiment thereof which is to be read in connection with the accompanying drawings, wherein:

FIG. 1 is a perspective view of a ship of the type in which the present invention may be employed;

FIG. 2 is a schematic view, partly in section, taken on line 2—2 of FIG. 1, showing one embodiment of a tank support system adapted to be utilized in conjunction with the present invention;

FIG. 3 is an enlarged schematic sectional view of the tank of FIG. 2, showing the connection between the tank and the tank support structure;

FIG. 4 is a schematic sectional view similar to FIG. 3 of another embodiment of the invention; and FIG. 5 is a graph of a typical thermal gradient in the skirt structure of FIGS. 3 and 4.

Referring now to the drawing in detail and initially to FIG. 1 thereof, it will be seen that a ship 10 of the type in which the present invention may be employed contains five spherical tanks 12 which are mounted in the ship's hull and which are adapted to contain liquified gas, such as for example, methane, ethylene, propane and chlorine. It is noted that while in the illustrative embodiment of this invention only five tanks 12 have been illustrated, it is contemplated that more or less of such tanks may be provided on marine vessels to meet varying operational requirements.

Tanks 12 are formed by plate construction, preferable by utilizing full penetration welding which is readily subjected to non-destructive testing. Such tanks are readily fabricated to the high standards required in the shipping industry and they may constitute pressure vessels which may be adapted to contain a liquified gas in moderate pressures as for example, a few atmospheres. Such vessels are formed as membrane structures having no internal support systems, so that the entire pressure load is taken by the shell of the tank construction. In addition, it is noted that although shpherical tanks are shown in the drawing for illustrative purposes, it is contemplated that other shapes of tanks may be utilized in connection with the invention, including cylindrical and conically shaped tanks, rectangular tanks and even tanks of irregular configurations.

In the preferred embodiment of the present invention, tanks 12, as seen in FIG. 2, are directly mounted to the hull 14 of ship 10 by a skirt structure 16. The latter is formed of a plurality of plates welded together, again preferably by full penetration welding, to form an integral annular support structure which is welded at its top edge 18 to the periphery of tank 12 along the latter's equatorial plane. The opposed edge 20 of skirt 16 is welded directly to the hull 14 of ship 10 at point 22 and thus an integral structure is formed including hull 14, skirt 16 and tank 12.

The use of the spherical tank in the illustrative embodiment of the invention minimizes the amount of space in the ship's hull occupied by the tank structure. As a result, the spherical structure leaves room within the already determined hull dimensions for bottom longitudinal ring tanks 24 and bottom transverse tanks (not shown) for carrying ballast of fuel. These tank structures, together with the other hull structures, increase the tortional and bending stiffness of the hull. Additional tanks 26, located below tanks 12 form double bottom fuel or ballast tanks.

As mentioned above, skirt 16 in the illustrative embodiment of the invention is welded directly to tank 12. However, it is contemplated that other types of connection structures, such as the interface structure described and claimed in our above-mentioned patent application may be utilized, as well as the other connection structures disclosed in that patent application. In addition, it is contemplated that the insulation system of the present invention can be used with other supporting structures than those disclosed in this application or our above application, as the present invention has utility with substantially any type of cargo tank supporting arrangement.

In any case, the support system disclosed in this application and in our above-mentioned patent application, is stress determinant, that is, since tank 12 is integrally secured to the hull structure of ship 10, the stress transferred between the tank and the hull structure, due to the stresses to which the ship is subjected and to the thermal stresses produced in loading and unloading of the tank, may be accurately determined. The accurate determination of the stress is achieved due to the accurate and specific connection of the skirt to the tank. Thus, the tank and its support system may be accurately designed to transmit minimum stresses to the tank itself so that in the event of a tank leak, catastrophic failure thereof will not occur. Detailed description and discussion of the stress determinant features of the tank support system disclosed herein is provided in our above-mentioned patent application.

To enhance the design of such stress determinant tank structures, it is desirable to minimize the thermal stresses applied to the tank by the supporting system, whether that supporting system is a system such as shown in our prior applications or any other convenient cargo tank supporting systems. This is due to the fact that the net stress on cargo tanks in marine vessels is the sum of the static, dynamic and thermal stresses applied thereto. The static stresses are applied by the weight of the tank and its contents, the dynamic stresses are applied by the stresses to which the ship is subjected while passing through the sea, and the thermal effects are created during loading and unloading of the liquified gas contents of the tank. In accordance with the present invention it has been found that thermal stresses applied to the tank through the skirt of supporting structure can be substantially eliminated so that the major factors in considering the design of the tank 12 are the static and dynamic structures. More specifically, it has been found that the thermal stresses applied to the tank wall can be substantially eliminated because of the fact that the tank cools and contracts to a greater amount in going from its warm ambient, or out of service condition, to its cold ambient, in service condition, that does the lower part of the support structure or the inner bottom of the hull structure 14. The difference in the net contraction or expansion between the tank and the hull sets up stresses in the support structure between the fixed ends of the support, i.e., between the fixed ends of the support (skirt 16 in FIG. 2) at the tank and the hull. In previously proposed transport systems, these stresses are directly transmitted to the cargo tank and thus must be accounted for in the design of the tank. However, in accordance with the present invention, it has been found that by the appropriate heat balance calculations, and by stress analysis, it is possible to determine, and thus control and position or locate the temperature gradient (and the resultant thermal stresses) in the tank support sturcture to those areas of the support structure where the effect on net tank stress is minimized.

This is accomplised with the present invention by providing a layer of thermal insulation material, such as for example, foamed polyurethane or polystyrene on the exterior surface of the tank 12 and on the supporting structure itself. For example, as seen in FIG. 3, tank 12 is substantially entirely covered with a layer 28 of insulating material which prevents heat from entering the tank from the atmosphere so as to maintain cold conditions within the tank. A portion 30 of the tank is uninsulated, between the tank and skirt 16, as seen in FIG. 3, to provide space for gas leak detection instruments, strain gauges, and other similar devices utilized in monitoring the conditions of the tank. However, the absence of thermal insulation at this point does not effect the operation of the tank or the invention since the support member 16 adjacent this portion of the tank is itself insulated by insulation material 28 so that the tank is itself insulated thereby. In any case, tank section 30 also could be coated with insulation if desired. The insulation material is secured to the tank in any convenient manner such as by an adhesive or by any convenient mechanical connection between the layer of insulation and the tank.

Insulation material 28 also extends along the support structure, which in the illustrative embodiment constitutes skirt 16. The insulation material has a generally uniform thickness on opposite sides of the skirt from the point of juncture 31 of the skirt with the tank to a predetermined point 32 located a predetermined distance away from the point of juncture 31. From point 32 to a termination point 34, closer to hull structure 14 than point 32, the insulation material 28 is tapered, in a controlled manner for a predetermined distance between these points. The extent and shape of the tapered portion 36 of the insulation material 28 is predetermined by heat engineering calculations so that a temperature gradient is achieved in the skirt that results in acceptable thermal stresses in the skirt, with a minimum of thermal stresses being transferred to the tank itself. Generally, the insulation should be designed so that the gradient in the skirt reaches ambient temperature, or a temperature which will not effect the hull integrity, at point 34. As a result, the lowermost portion of the skirt, adjacent hull 14, is thermally isolated from the uppermost portion of the skirt and the migration of heat from the hull to the tank is controlled, with the major portion of the thermal stresses, due to the difference in temperature between the ends of the skirts occurring in the tapered portion 36 of the insulation material.

The tapered portion 36 of the insulation material can take any convenient shape as determined by engineering calculations and may be a smooth curve as illustrated in FIG. 3 or, alternatively, may consist of a plurality of step down segments, leading to a termination point 34, as illustrated in FIG. 4. In either case, the tapered configuration is designed to produce the desired thermal stress gradient.

Referring to FIG. 5 of the drawing, there is illustrated a graph which shows the variation in temperature between the point of juncture 30 of skirt 16 (of the embodiment of FIG. 3) and the termination point 34 of the insulation, while the tank 12 is in use.

For convenience in understanding the invention, the graph of FIG. 5 is located in alignment with FIGS. 3 and 4, with the uppermost portion of the graph representing the point of juncture 30 of skirt 16 with tank 12 in FIGS. 3 and 4 and the lowermost portion of the graph located in alignment with the termination point 34 of the insulation, so as to provide a ready comparison of the temperatures at each point in the skirt 16. These temperatures are of course a function of the thermal stresses in the skirt at the respective points.

As seen in FIG. 5, where the temperature in the tank if $-160°C$ (the normal temperature for LNG), the temperature in skirt 16 remains substantially the same or decreases only slightly along the portion of the skirt between the point of juncture 31 and point 32. Thereafter, between point 32 and termination point 34 of insulation 28, the temperature in the skirt drops off relatively sharply to approximately $-30°c$. Accordingly, it is seen that the greatest change in temperature in the skirt takes place in this portion of the skirt and that, as a result, the greatest thermal stresses are accommodated in the skirt itself. Moreover, since the temperature of the skirt adjacent the tank is substantially the same as the tank, a minimum of thermal stress is applied from the skirt to the tank itself. Thus, the tank can be designed primarily on the basis of the static and dynamic stresses to which it will be subjected. Moreover, from termination point 34 to hull structure 14, the temperature of the support structure will further increase towards ambient and ultimately reach approximately 30°F or 0°C at hull structure 14. Thus, the hull is also thermally isolated from the tank so that its temperature will not drop to a point which will jeopardize its integrity since the hull is normally made of a less thermally resistant metal than the tank.

In one embodiment of the invention which has been designed, tank 12 has a radius of 120 feet, with the skirt 16 having a length or height of 40 feet. In this case, an 8 inch thick layer of polyurethane foam is secured to the exterior of tank 12, in the manner illustrated in FIG. 3, with a similar 8 inch layer of insulation material placed over the skirt 16. The insulation layer on skirt 16 has a relatively constant dimension between the point of juncture 31 and point 32 of 8 inches, with the distance between these points being approximately 11 feet, 6 inches. The insulation material is then smoothly tapered, as seen in FIG. 3, between point 32 and termination point 34 over a length of 7½ feet, with the exposed skirt, between point 34 and hull structure 14, being 22 feet. In this arrangement, the desirable stress gradient pattern illustrated in FIG. 5 is created so that a minimum of thermal stress is applied to the tank itself. As a result, the tank can be designed to be stress determinant, as described above and in our previously filed application, so as to eliminate the requirement of dual tank structures previously utilized in the prior art.

Accordingly, it is seen that by the present invention the temperatures in the skirt or support structure of an LNG cargo tank is reduced in a gradual and controlled manner from the ship's hull structure, which is at or near ambient temperature, to the skirt top (at its juncture with the tank), which is at the tank cargo temperature of approximately −160°C. Accordingly, the insulation material applied to the support structure in this manner reduces and controls the heat leakage from the atmosphere and hull into the tank, so that the tank is maintained at a constant temperature uneffected by the ambient, while the hull structure is isolated from the tank so that its temperature remains at or adjacent ambient and therefore at safe levels to avoid brittle failure therein.

More importantly, the control of the thermal stress of the temperature gradient in the support structure in this manner produces a predetermined temperature gradient throughout the skirt so that the thermal strains or stresses accompanying the temperature gradient in the skirt are located over the height of the support structure where they will have a minimum effect on the tank itself. Thus, little or no thermal stress will be applied to the tank itself.

Again, it is noted that although the illustrative embodiment of the invention has been described with respect to skirt type support systems, it is to be understood by those skilled in the art that the features of the present invention utilizing a tapered insulation over the support structure could be utilized with other convenient or conventional support structures as would occur to those skilled in the art. In any case, the concept of the invention is equally applicable to such support structures, in that it should always be desirable to control the thermal stresses applied to the tank in the manner described herein.

Although an illustrative embodiment of the present invention has been described herein with reference to the accompanying drawings, it is to be understood that that invention is not limited to that precise embodiment and that various changes and modifications may be effected therein by one skilled in the art without departing from the scope or spirit of this invention.

What is claimed is:

1. Apparatus for storing liquified gas on a support structure which is at ambient temperature comprising, a spherical tank for containing said liquified gas, an annular support ring formed of the same material as said tank and being integrally and tangentially connected to the periphery of said tank adjacent an equatorial portion thereof; said ring being operatively connected to said support structure for supporting said tank on said structure whereby said annular support ring expands and contracts simultaneously with and to substantially the same extent as said tank at the point of juncture of the tank and the annular ring; and means for controlling the temperature drop and temperature gradient in said support ring between its point of juncture with said tank and the support structure to cause the deflection of said annular ring as a result of the temperature differentials at its opposite ends to occur in the central portion of the ring, thereby to minimize stress in the tank and at the point of juncture of the tank with the support ring; said means comprising thermal insulation material secured to and surrounding the exterior of said tank and a predetermined portion of said support ring, said thermal insulation material extending along said support ring from the point of juncture of the support ring with said tank towards said support structure and having a controlled and decreasing thickness along said ring from its point of juncture with the tank for a predetermined distance along said ring thereby to control the temperature gradient in the support ring to a predetermined pattern to permit said ring at its point of juncture with said tank to expand and contract simultaneously with the tank and to distribute the thermal stresses in and the thermal deformations of said support ring to a predetermined pattern in a central portion of the ring below its point of juncture with the tank and above said support structure, thereby to minimize the stress in the tank and at the point of juncture of the tank with the support ring.

2. Apparatus for storing liquified gas at low temperatures on a support structure which is at ambient temperature, comprising: a tank for containing the liquified gas having a generally circular horizontal cross-section with substantially hemispherical top and bottom portions, a support ring having a top portion which comprises the portion of said tank around said circular horizontal cross-section and a skirt portion which projects downwardly from said top portion substantially tangentially to said tank with said bottom hemispherical portion of the tank being spaced progressively away from said skirt portion progressively downwardly from said top portion of said ring, a support structure at the bottom of said skirt portion and providing the support for said tank, and thermal insulation means enclosing said tank and said ring, said thermal insulation being varied in thickness and shape with a thickness throughout the surface of said tank to provide satisfactory operating conditions and having a reduced thickness along said skirt portion of said ring to provide a progressive temperature drop between said top portion of said ring and said support structure and prevent an excessive temperature gradient at any zone along said skirt portion and to maintain a predetermined pattern and position of said temperature gradient between said top portion of said ring and said support structure.

3. Apparatus as defined in claim 2 wherein said thermal insulation is tapered in a relatively smooth curve from a maximum dimension at a first point located a predetermined distance from the point of juncture of said support ring and said tank to a minimum dimension at a second point located a predetermined distance from said first point.

4. Apparatus as defined in claim 2 wherein said thermal insulation is tapered in a plurality of segments of uniform width, with each successive segment having a narrower uniform width than a preceeding segment.

5. Apparatus as defined in claim 2 wherein said support structure comprises a marine vessel and said tank has a generally circular crosssection.

6. Apparatus as defined in claim 5 wherein said support ring comprises an annular skirt member extending about the periphery of said tank and being integrally secured at one end to said tank and integrally secured at its opposite end to the structural members of said marine vessel.

7. Apparatus as defined in claim 6 wherein said tank includes an integral peripheral interface structure and said one edge of said skirt is integrally secured to said structure.

8. Apparatus as defined in claim 2 wherein said tank has a radius of approximately 120 feet and said supporting means has a height of approximately 40 feet and is covered by said insulating material over a length of approximately 18 feet.

9. Apparatus as defined in claim 8 wherein said insulating material has a maximum thickness of approximately 8 inches on opposite sides of said supporting means and is tapered from said maximum thickness to zero over a length of approximately 7 feet 6 inches.

* * * * *

UNITED STATES PATENT OFFICE
CERTIFICATE OF CORRECTION

Patent No. 3,828,709             Dated August 13, 1974

Inventor(s) Ragnar Bognaes; and Olav Solberg

It is certified that error appears in the above-identified patent and that said Letters Patent are hereby corrected as shown below:

In the heading the name of the Assignee "Kvaenner Brug AS"

is changed to --Kvaerner Brug AS--.

Signed and sealed this 17th day of December 1974.

(SEAL)
Attest:

McCOY M. GIBSON JR.            C. MARSHALL DANN
Attesting Officer              Commissioner of Patents